United States Patent
Tasaki et al.

[15] 3,637,283
[45] Jan. 25, 1972

[54] STEREOMICROSCOPE WITH ILLUMINATION BY SPECULARLY REFLECTED LIGHT

[72] Inventors: Toshio Tasaki; Keiji Fukao, both of Tokyo, Japan

[73] Assignee: Olympus Optical Co., Ltd., Tokyo, Japan

[22] Filed: July 6, 1970

[21] Appl. No.: 52,364

[52] U.S. Cl. ............................................. 350/91, 350/238
[51] Int. Cl. ............................................................ G02b 21/06
[58] Field of Search .................. 350/91, 35, 36, 12, 235, 238; 356/109, 120, 161, 209

[56] References Cited

UNITED STATES PATENTS 3,512,860   5/1970   Hansen et al. ........................... 350/36
3,405,990   10/1968  Nothnagle et al ....................... 350/91

FOREIGN PATENTS OR APPLICATIONS 915,156   7/1954   Germany ................................. 350/91

OTHER PUBLICATIONS

Bausch & Lomb Stereomicroscopes, Catalog D-15, pp. 11 and 15, Nov. 1952
Optical Spectra, March, 1970, Vol. 4, No. 3, p. 76

*Primary Examiner*—David Schonberg
*Assistant Examiner*—Ronald J. Stern
*Attorney*—Kelman and Berman

[57] ABSTRACT

Illuminating system for a stereoscopic microscope which directs a pair of illuminating light beams toward the viewed object. The angle formed between the beams is equal to the parallax angle formed between the optical axes of the two objective lenses of the microscope while the plane defined by the bisectors of the parallax angle and of the angle between the illuminating beams is perpendicular to the planes respectively defined by the optical axes of the objective lenses and the illuminating beams, the optical axes and the illuminating beams converging in a common point on the surface of the object, thereby permitting the light from the respective illuminating beams to be directly reflected by the surface of the object to a respective objective lens so that the object is observed in a bright field of view while the stereoscopic observation of the object is carried out.

2 Claims, 13 Drawing Figures

PATENTED JAN 25 1972

INVENTORS.
Toshio Tasaki
Keiji Fukao
BY: Kelman and Berman
AGENTS

INVENTORS.
Toshio Tasaki
Keiji Fukao
BY: Kelman and Berman
AGENTS

STEREOMICROSCOPE WITH ILLUMINATION BY SPECULARLY REFLECTED LIGHT

BACKGROUND OF THE INVENTION

The present invention relates to an illuminating system for a stereoscopic microscope, and more particularly, to an illuminating system for a stereoscopic microscope by which an object to be inspected is observed in the bright field of view by the nonscattered directly reflected illuminating light directly reflected from the surface of the object while the stereoscopic observation of the object is carried out.

Heretofore, an illuminating system has been used together with a stereoscopic microscope in which the illuminating light is directed to the object in the direction obliquely downwardly thereto so that a portion of the scattered reflected light from the surface of the object is received by the pair of objective lenses of the microscope for obtaining the stereoscopic observation of the object. By such an illuminating system, however, almost all part of the light reflected by the surface of the object can not be received by the objective lenses when the surface of the object is flat and smooth and the object is transparent unless scratches or foreign matters exist in the object thereby making it impossible to observe the object, because the illuminating light from the illuminating system is directed to the surface of the object obliquely downwardly and the light is reflected in the direction spaced from the objective lenses depending upon the incident angle of the illuminating light to the surface of the object without causing any substantial scattering of the light which might be received by the objective lenses. Therefore, it is impossible to observe the object of the type described above in the bright field of view by means of the illuminating system described above.

On the other hand, interference color has been recently utilized in the field of electronic industry in order to investigate the state of diffusion in the surface of the pellet of an integrated circuit. The interference color is generated by the interference between the light directly reflected from the surface of the pellet and the light reflected from the lower surface of the diffused layer of the pellet and the interference color is varied depending upon the thickness of the diffused layer. Therefore, the thickness or the condition of a thin film such as the diffused layer can be determined by investigating the interference color. In order to investigate the interference color, however, the nonscattered directly reflected illuminating light reflected from the object must be directly received by the objective lenses. To this end, a metallurgical microscope has been utilized which has an objective lens in which a semitransparent mirror is provided so as to reflect the illuminating light received laterally from the side of the objective lens toward the object along the optical axis thereof and the light reflected by the object passes through the semitransparent mirror toward the eyepiece of the microscope so as to permit the image of the object to be viewed thereby. In such a metallurgical microscope, however, the working distance can not be made sufficiently great because no appropriate objective lens has been developed to enable the working distance to be sufficiently great, while the stereoscopic observation of the object can be carried out by the metallurgical microscope.

Thus, it has been desired to develop the measures to permit the interference color to be observed by using a stereoscopic microscope.

The present invention aims at achieving the above described measures so that the object is observed stereoscopically in the bright field of view by the nonscattered directly reflected illuminating light from the object.

SUMMARY OF THE INVENTION

As object of the present invention is to provide a novel and useful illuminating system for a stereoscopic microscope which avoids the above-described disadvantages of the prior art and permits the object to be stereoscopically observed in the bright field of view.

Another object is to provide a novel and useful illuminating system for a stereoscopic microscope by which the nonscattered directly reflected illuminating light from the object is received directly by each of the pair of objective lenses of the microscope so as to permit the interference color generated by the object to be observed while the object is stereoscopically observed.

The illuminating system constructed in accordance with the present invention is characterized by the provision of a pair of illuminating means adapted to direct the light toward the object along the respective optical axes thereof, the angle formed between the optical axes thereof being made equal to the parallax angle formed between the optical axes of the pair of objective lenses of the microscope which are also directed to the object, the plane including the bisector of the optical axes of the objective lenses and the bisector of the optical axes of the illuminating means being made perpendicular to the line on the surface of the object in which the plane including the optical axes of the objective lenses intersects the plane including the optical axes of the illuminating means while the angle formed between the plane including the optical axes of the objective lenses and a line perpendicular to the surface of the object is made equal to the angle formed between the plane including the optical axes of the illuminating means and the line perpendicular to the surface of the object. Thus, the nonscattered directly reflected illuminating light from each of the illuminating means is directly received by the respective objective lens so as to permit the object to be observed in the bright field of view while the stereoscopic observation is achieved.

The illuminating system may be adjustably mounted on the microscope so as to permit the illuminating system to be adjusted depending upon the inclination of the surface of the object.

The main housing of the microscope mounting thereon the objective lenses and eyepieces cooperating with the objective lenses may be slidably mounted on a supporting pole for adjusting the focusing of the object, and the direction in which the pole extends may be made parallel to the bisector of the optical axes of the objective lenses so that the point in the object observed by the microscope can be always kept in the fixed point in the field of view regardless of the adjustment of the main housing on the pole for the focusing of the object.

DETAILED DESCRIPTION OF THE PREFERRED EMBODIMENTS

Figure 1:
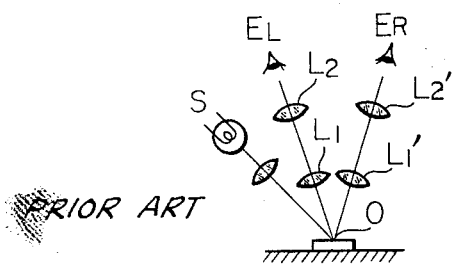
FIG. 1 is a schematic view showing the prior art illuminating system for a stereoscopic microscope.

Referring to FIG. 1 showing the prior art illuminating system for a stereoscopic microscope, an object O is viewed through a pair of microscope optical systems comprising objective lens $L_1$ and eyepiece $L_2$ and objective lens $L_1'$ and eyepiece $L_2'$ respectively, by the respective eyes $E_L$ and $E_R$ of the observer. The illuminating light from the lamp S is directed to object O obliquely downwardly so that only the scattered light by the surface of object O is received by each of objective lenses $L_1$ $L_1'$ Therefore, a major part of the light is reflected in a direction away from objective lenses $L_1$ $L_1'$ when the surface of object O is flat and smooth ad object O is transparent thereby making it impossible to observe object O in the bright field of view.

Figure 2:
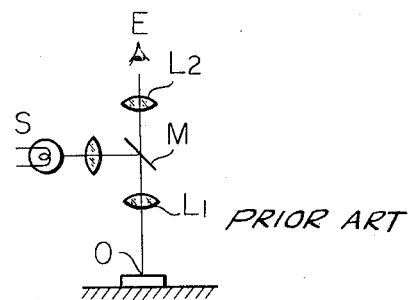
FIG. 2 is a view similar to FIG. 1 but showing the illuminating system of a metallurgical microscope.

Referring to FIG. 2 showing the optical system of a metallurgical microscope, the illuminating light from lamp S is reflected by semitransparent mirror M located diagonally of the optical axis of the microscope toward object O through objective lens $L_1$ and the light reflected by the object O again passes through objective lens $L_1$ and through eyepiece $L_2$ to eye E of the observer so that the nonscattered directly reflected light is incident to eye E so that the interference color generated by object O, if such is generated, can be observed. However, as previously described, no objective lens has been developed to construct the above described optical system while the working distance is kept sufficiently long. Further, it is impossible to stereoscopically observe object O by using the above described optical system.

Figure 3:
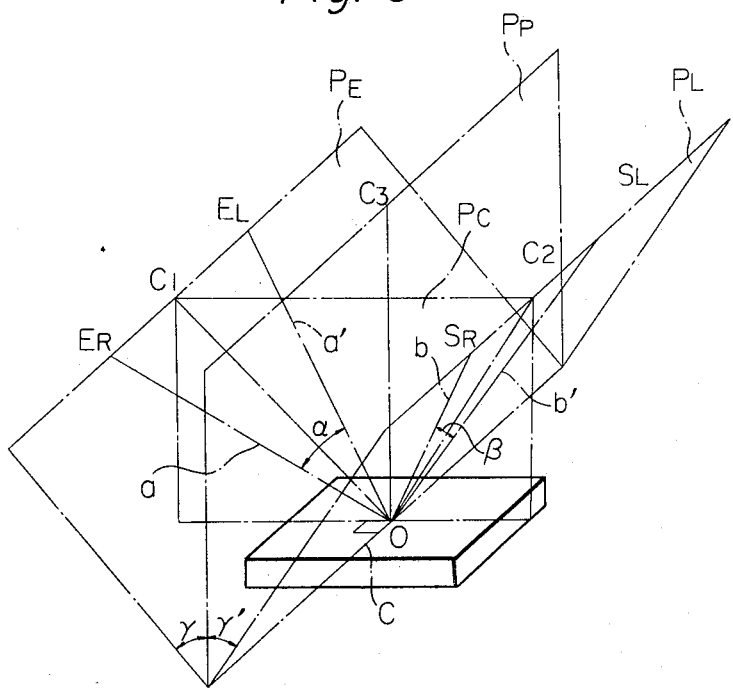
FIG. 3 is a schematic perspective view showing the principle of the present invention.

Referring to FIG. 3 showing the principle of the present invention, optical axes $a$, $a'$ of the pair of objective lenses pass point O of the object and form therebetween a parallax angle $\alpha$ so as to permit the object to be stereoscopically observed. The axes $b$, $b'$ of a pair of illuminating light beams pass point O of the object and form an angle $\beta$ therebetween.

In accordance with the present invention, parallax angle $\alpha$ is equal to angle $\beta$ while plane Pc including bisector $OC_1$ of angle a and bisector $OC_2$ of angle B is made perpendicular to line C on the surface of the object which includes point O and in which plane $P_E$ including optical axes $a$, $a'$ intersects plane $P_L$ including axes $b$, $b'$. Further, angle $\alpha$ formed between plane $P_E$ including optical axes $a$, $a'$ and line $OC_3$ perpendicular to the surface of the object or plane $P_p$ including line $OC_3$ and line C is made equal to angle $\gamma'$ formed between plane $P_L$ including axes $b$, $b'$ and line $OC_3$ or plane $P_p$ so that the line $OC_3$ bisects the angle formed by the bisectors $OC_1$ and $OC_2$ and the plane $P_c$ defined by the bisectors is perpendicular to the planes $P_E$ and $P_L$.

By the arrangement described above, the light incident to point O along axis b is reflected by the surface of the object and the nonscattered directly reflected light is directed along optical axis $a'$ while the light incident to point O along axis $b'$ is reflected by the surface of the object and the nonscattered directly reflected light is directed along optical axis $a$. Thus, the object is observed in the bright field of view even though the surface of the object is flat and smooth and the object is transparent.

Figure 4:
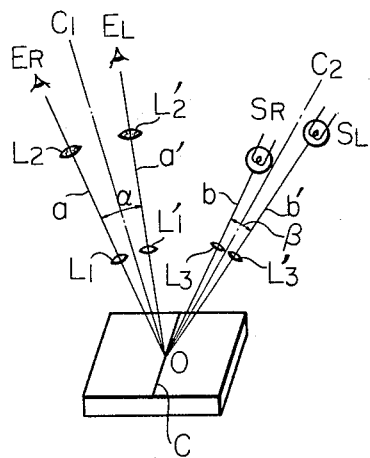
FIG. 4 is a schematic perspective view showing the general arrangement of the illuminating system of the present invention.
Figure 5:
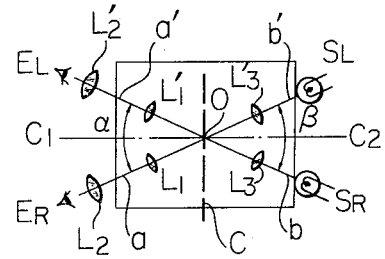
FIG. 5 is a plan view of FIG. 4.
Figure 6:
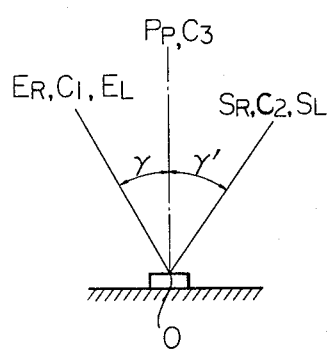
FIG. 6 is a side view of FIG. 4 as seen in the direction of line C in FIG. 4.

FIGS. 4 and 5 show the arrangement of the optical elements forming an embodiment of the optical system of the present invention. Objective lens $L_1$ and eyepiece $L_2$ are located in optical axis $a$ passing through point O of the object while objective lens $L_1'$ and eyepiece $L_2'$ are arranged in optical axis $a'$ also passing through point O so that they cooperate together to permit object O to be observed stereoscopically by eyes $E_R$ and $E_L$ of the observer with parallax angle $\alpha$ formed between optical axes $a$ and $a'$. In like manner, light source $S_R$ and condenser lens $L_3$ are arranged in optical axis $b$ while light source $S_L$ and condenser lens $L_3'$ are arranged on optical axis $b'$ so as to illuminate object O with an angle $\beta$ formed between optical axes $b$ and $b'$. As shown in FIG. 3, angle $\alpha$ is made equal to angle $\beta$ Also, plane $OC_1C_2$ including bisectors $OC_1$ and $OC_2$ is made perpendicular to line C in which plane $OE_RE_L$ including optical axes $a$, $a'$ intersects plane $OS_RS_L$ including axes $b$, $b'$ while angle $\gamma$ (FIG. 6) formed between plane $OE_RE_L$ and a line $OC_3$ or a plane $P_p$ (FIG. 6) perpendicular to the surface of object O is made equal to angle $\gamma'$ formed between plane $OS_RS_L$ and line $OC_3$ or plane $P_p$. Thus, the effect of the illumination described with reference to FIG. 3 is achieved.

Figure 7:
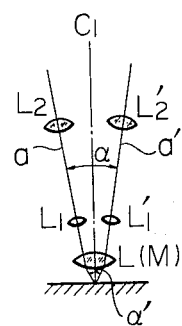
FIG. 7 is a side view showing a modification of the objective lenses in which an additional lens component for varying the magnification is incorporated.

FIG. 7 shows a modification of the optical system of the microscope in which an additional lens component L(M) is arranged in front of the pair of objective lenses $L_1$ $L_1'$ so as to permit the magnification of the microscope to be varied by deflecting optical axes $a$, $a'$ to form an angle $\alpha'$ therebetween.

In this embodiment, axes $b$, $b'$ must be positioned to satisfy the condition shown in FIG. 3 in relation to optical axes of objective lenses $L_1$ $L_1'$ existing between the object and additional lens component L(M).

Figure 8:
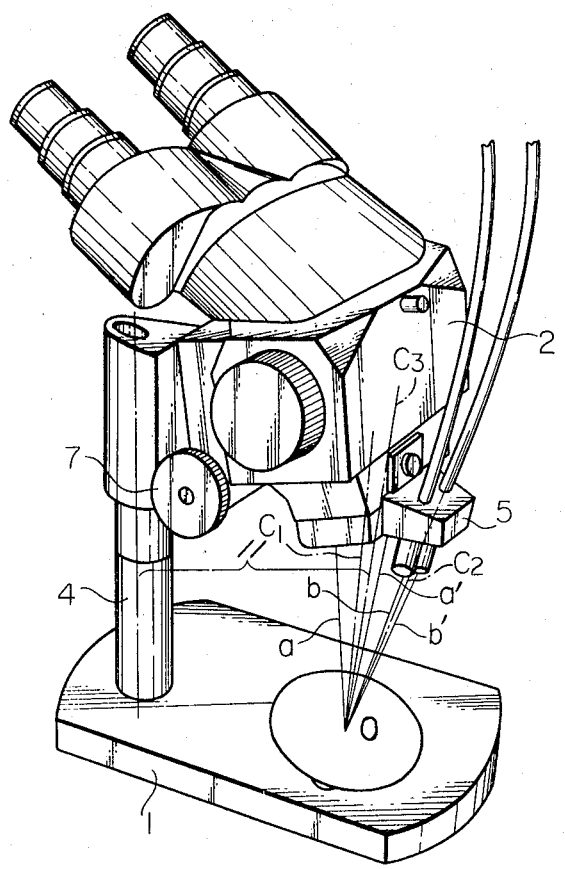
FIG. 8 is a perspective view of an embodiment of the present invention in which a pair of fiber optical systems are incorporated.

FIG. 8 shows another embodiment of the present invention in which a pair of fiber optical systems are utilized as the pair of illuminating beams. A light source (not shown) supplies illuminating light to the rearward end of each of the fiber optical systems so that the light is transmitted therethrough to the forward end so as to illuminate the object. Main housing 2 mounting thereon the pair of objective lenses and the pair of eyepieces is slidably supported by upstanding supporting pole 4 which is secured to a base 1 on which the object O is being held. Adjustment of the focusing is effected by adjusting knob 7 in conventional manner. As seen in FIG. 8, the axis of pole 4 is made parallel to line $OC_3$ described in connection with FIG. 3. This construction permits the illuminating system to be made compact.

Figure 9:
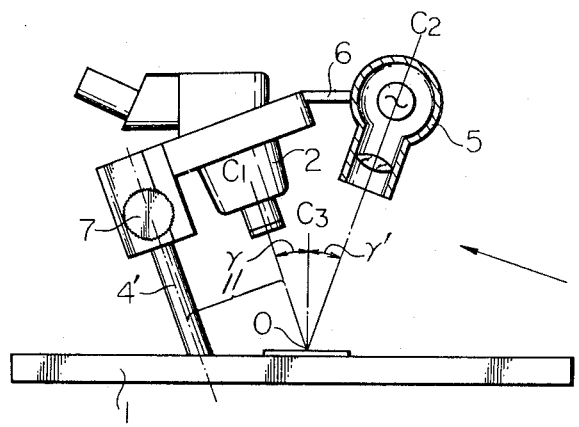
FIG. 9 is a side view of an embodiment of the present invention in which the supporting pole of the main housing is made parallel to the bisector of the optical axes of the objective lenses.

FIG. 9 shows a further modification of the present invention. In this embodiment, supporting pole 4' is secured to base 1 in the inclined direction parallel o bisector $OC_1$ of the optical axes of the pair of objective lenses. Thus, the point O of the object observed by the microscope is kept stationary in the field of view during the adjustment of the focusing of the object.

Figure 10:
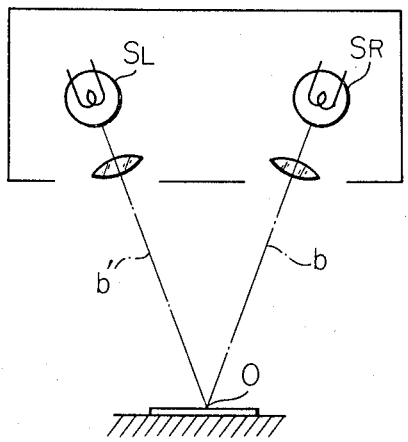
FIG. 10 is a view showing the arrangement of the illuminating means of the present invention.
Figure 11:
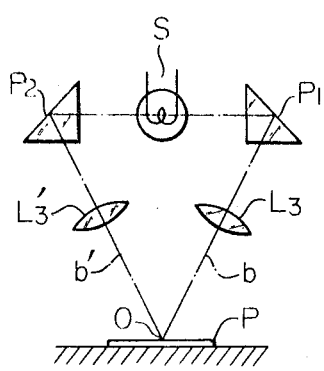
FIG. 11 is a view showing a modification of the illuminating means.
Figure 12:
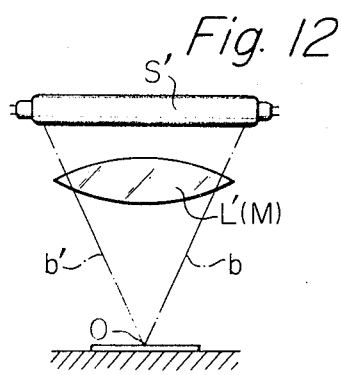
FIG. 12 is a view showing another modification of the illuminating means.

FIGS. 10 to 12 shows various embodiments of the illuminating means. In FIG. 10, a pair of lamps $S_L$ $S_R$ are used as the light source. In FIG. 11, a single lamp S and a pair of reflecting prisms $P_1$ $P_2$ adapted to receive light from lamp S, respectively, are provided as shown. The light reflected by prism $P_1$ is directed to object O through condenser lens $L_3$ along optical axis b while the light reflected by prism $P_2$ is directed to object O through condenser lens $L_3'$ along optical axis $b'$.

In FIG. 12, an elongated fluorescent lamp S' is used as shown.

Figure 13:
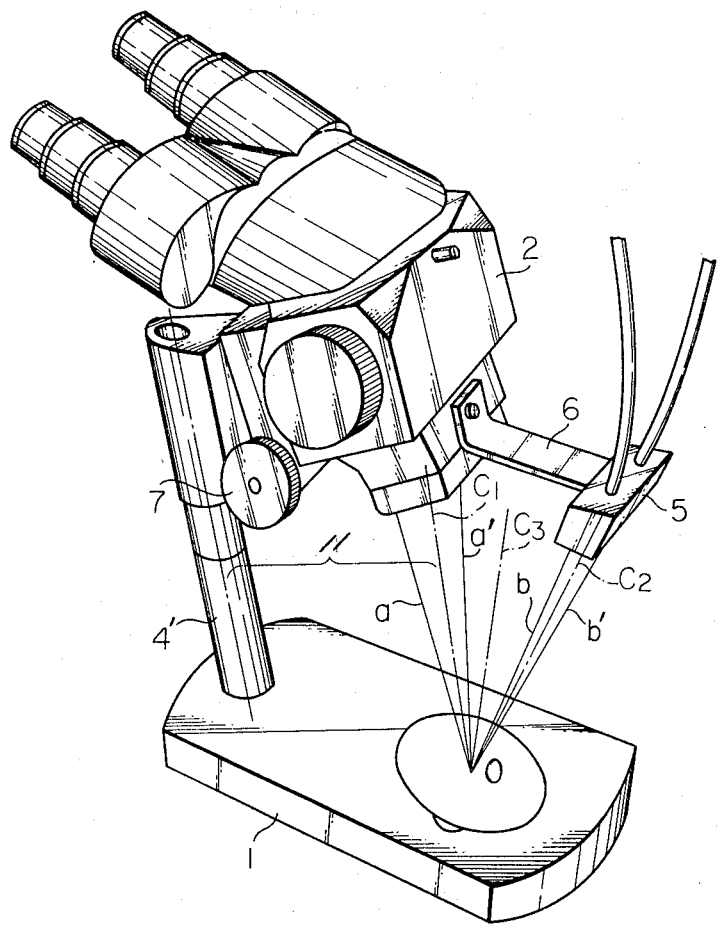
FIG. 13 is a perspective view showing a modification of FIG. 9 in which a pair of fiber optical systems are incorporated.

FIG. 13 shows an embodiment similar to FIG. 9 except that a pair of fiber optical systems are used as the illuminating means in like manner as the embodiment of FIG. 8. The fiber optical systems are supported by a block 5 which is in turn supported by main housing 2 through connecting rod 6. Pole 4' is made parallel to bisector $OC_1$ of optical axes $a$, $a'$ of the objective lenses.

I claim:

1. A stereoscopic microscope comprising, in combination:
   a. a support;
   b. holding means on said support for holding an object to be viewed;
   c. two optical systems on said support including respective objective lenses and eyepieces and having respective optical axes converging at a first angle in a point of an object held by said holding means; and
   d. source means on said support for emitting two beams of light,
      1 said beams converging in said point at a second angle equal to said first angle,
      2. said angles having respective bisectors converging in said point at a third angle,
      3. said optical axes, said beams, and said bisectors defining respective planes, the planes respectively defined by said optical axes and by said beams intersecting each other in a line through said point, and the plane defined by said bisectors being perpendicular to said line and to each of said planes intersecting each other in said line.

2. A microscope as set forth in claim 1, wherein said holding means include means for holding a surface of said object in a position in which the bisector of said third angle is perpendicular to said surface in said point.

* * * * *